(12) United States Patent
Morrissey et al.

(10) Patent No.: US 12,194,454 B2
(45) Date of Patent: Jan. 14, 2025

(54) FLUID TRANSFER SYSTEM FOR ISOLATORS

(71) Applicant: EMD MILLIPORE CORPORATION, Burlington, MA (US)

(72) Inventors: Martin Morrissey, Billerica, MA (US); Conor King, Marblehead, MA (US); Philip Borozenets, Newton, MA (US)

(73) Assignee: EMD MILLIPORE CORPORATION, Burlington, MA (US)

( * ) Notice: Subject to any disclaimer, the term of this patent is extended or adjusted under 35 U.S.C. 154(b) by 590 days.

(21) Appl. No.: 17/609,008

(22) PCT Filed: Aug. 6, 2020

(86) PCT No.: PCT/US2020/045085
§ 371 (c)(1),
(2) Date: Nov. 5, 2021

(87) PCT Pub. No.: WO2021/040983
PCT Pub. Date: Mar. 4, 2021

(65) Prior Publication Data
US 2022/0184599 A1 Jun. 16, 2022

Related U.S. Application Data

(60) Provisional application No. 62/891,493, filed on Aug. 26, 2019.

(51) Int. Cl.
*B01L 1/04* (2006.01)
*B25J 21/00* (2006.01)
*B25J 21/02* (2006.01)

(52) U.S. Cl.
CPC ............. *B01L 1/04* (2013.01); *B25J 21/005* (2013.01); *B25J 21/02* (2013.01); *B01L 2200/026* (2013.01); *B01L 2200/0689* (2013.01)

(58) Field of Classification Search
CPC ............. B01L 1/04; B01L 2200/026; B01L 2200/0689; B25J 21/005; B25J 21/02
See application file for complete search history.

(56) References Cited

U.S. PATENT DOCUMENTS

| 7,243,689 B2 * | 7/2007 | Py | B29C 66/001 |
| | | | 141/2 |
| 10,196,161 B2 * | 2/2019 | Broadbent | B65B 7/161 |

(Continued)

FOREIGN PATENT DOCUMENTS

| CA | 3075445 A1 | 3/2019 |
| CN | 105392877 A | 3/2016 |

(Continued)

OTHER PUBLICATIONS

Office Action received for Korean Patent Application No. 10-2022-7006044, mailing date Jul. 19, 2023, 4 Pages (1 Page of English translation & 3 Pages of official copy).

(Continued)

*Primary Examiner* — Frederick C Nicolas
(74) *Attorney, Agent, or Firm* — EMD Millipore Corporation

(57) ABSTRACT

An apparatus for use with an isolator, including a crown for releasably joining with a beta port of the isolator, wherein the crown includes at least one anchoring support; a spring hook on at least one end of the at least one anchoring support; a needle block including at least one through hole for having a needle positioned therein, wherein the at least one needle is joined with tubing; a yoke; and a biasing element releasably joined with the yoke and the at least one anchoring support; wherein the needle block is releasably joined to the crown.

19 Claims, 7 Drawing Sheets

(56) References Cited

U.S. PATENT DOCUMENTS

| | | | |
|---|---|---|---|
| 10,684,303 B2* | 6/2020 | Procyshyn | C12M 41/14 |
| 10,781,002 B2* | 9/2020 | Broadbent | B65B 55/027 |
| 11,300,581 B2* | 4/2022 | Procyshyn | C12M 41/14 |
| 2006/0191594 A1 | 8/2006 | Py | |
| 2006/0191596 A1 | 8/2006 | Fontaine | |
| 2011/0192489 A1 | 8/2011 | Pobitschka | |
| 2016/0200461 A1 | 7/2016 | Broadbent et al. | |
| 2018/0127120 A1 | 5/2018 | Broadbent et al. | |
| 2019/0056419 A1 | 2/2019 | Procyshyn et al. | |

FOREIGN PATENT DOCUMENTS

| | | |
|---|---|---|
| DE | 102017216366 A1 | 3/2019 |
| EP | 1460126 A2 | 9/2004 |
| EP | 2313049 B1 | 4/2017 |
| JP | 2004-286568 A | 10/2004 |
| JP | 2004-329029 A | 11/2004 |
| WO | 2015/023924 A2 | 2/2015 |
| WO | 2021040983 A1 | 3/2021 |

OTHER PUBLICATIONS

International Search Report and Written Opinion received for PCT Patent Application No. PCT/US2020/045085, mailed on Nov. 18, 2020, 15 pages.

Office Action received for Chinese Patent Application No. 202080035228.8 mailing date Jan. 9, 2024, 5 Pages (2 Page of English translation and 3 pages of official copy).

Office Action received for Japanese Patent Application No. 2022-500563 mailed on Dec. 20, 2022, 7 Pages (3 Pages of English Translation & 4 Pages of Official copy).

Office Action received for Canadian Patent Application No. 3,139,834 mailed on Jan. 17, 2023, 4 Pages.

Office Action received for Chinese Patent Application No. 202080035228.8 mailing date Sep. 11, 2023, 13 Pages (5 Pages of English Translation and 8 Pages of Official Copy).

Office Action received for Japanese Patent Application No. 2022-500563 mailing date May 9, 2023, 7 Pages (4 Pages of English Translation & 3 Pages of Official copy).

First Examination Report received for Indian Application No. 202117055380 mailed on May 26, 2022, 7 Pages.

\* cited by examiner

FLUID TRANSFER SYSTEM FOR ISOLATORS

RELATED APPLICATIONS

This application is a U.S. National Stage application of International Application No. PCT/US2020/045085, filed Aug. 6, 2020, which claims the benefit of priority to U.S. Provisional Application No. 62/891,493, dated Aug. 26, 2019, the entire contents of each of which is incorporated by reference herein in its entirety.

FIELD OF THE DISCLOSURE

This disclosure relates to isolators. More particularly, embodiments of the disclosure relate to devices that facilitate the use of robotics within isolators.

BACKGROUND

A glove box is a sealed container that allows the handling of objects. Often, the glove box is used to prevent contamination of objects inside or to prevent reagents, i.e., hazardous substances, from contacting handlers. Typically, gloves are built into the glove box and placed so that that the hands of a user can be inserted into the gloves to perform tasks inside the box without breaking containment. Most glove boxes have transparent shields that permit the user to see what is being handled. These structures allow manual handling of objects.

Similarly, isolators, which are a subset of glove boxes, allow for easy manipulation and view of work in progress within a sealed environment. Isolators are used in bioprocess manufacturing operations to provide a very clean or sterile environment to prevent contamination via bacteria, viruses, germs, pathogens, and/or the like. Frequently, isolators are used in final fill operations, wherein a product, such as cells, virus-as-product, inactivated viruses, and other biological products are in solution and are transferred into, e.g., vials, for storage or shipping. Often, transfer ports are used to move materials into the isolator. Once materials (stoppers, vials, liquids, etc.) have been placed inside the isolator, they need to be handled and manipulated. Isolators also have glove ports that allow people to reach into the isolator without entering and contaminating the isolator or the products or materials contained therein. However, manual manipulation of materials and products within isolators is time intensive.

Isolators may comprise an alpha port and a beta port. An alpha port can be considered to be a hole in the isolator. A beta port can be considered to be a door that communicates or releasably locks with the alpha port. The beta port may be attached and hinged to the alpha port. In some embodiments, the beta port may not be hinged with the alpha port. The beta port may comprise plastics materials or metallic materials either for cleaning and re-use or as a single use item. The beta port is often adjacent to a glove port, so that materials may be placed into or removed from the alpha port, which is the access to the internal volume of the isolator where bioprocessing, such as fill-and-finish operations, occur.

Handling within isolators is increasingly performed by robots. Isolator manufacturers are now designing isolators without glove ports to obviate human manipulation to further reduce the possibility of contamination. However, the materials that are handled may be flexible, such as tubing, making handling by robots difficult. Moreover, some materials, such as needles, probes, cannulas, and the like, may easily damage other materials, such as a bioreactor bag (which are generally formed of one or more plastic films, such as polyethylene, polypropylene, polyethylene-vinyl acetate (EVA), polyethylene terephthalate (PET), polyamide (nylon), and the like) in which the biological products are processed, also making handling by robots difficult. Breaches of the bioreactor bags cause leaks and a loss of sterility within an inner volume of the bag or bioreactor.

Accordingly, devices allowing robots to safely and effectively handle flexible, difficult to manipulate materials within isolators represent an advance in the art.

SUMMARY OF SOME EMBODIMENTS

An apparatus for use with an isolator, including a crown for releasably joining with a beta port of the isolator, wherein the crown includes at least one anchoring support; a spring hook on at least one end of the at least one anchoring support; a needle block including at least one through hole for having a needle positioned therein, wherein the at least one needle is joined with tubing; a yoke; and a biasing element releasably joined with the yoke and the at least one anchoring support; wherein the needle block is releasably joined to the crown.

Embodiments of the present disclosure include a device and a method that facilitates the use of a robotic arm to move a liquid transfer needle set from a bag into the isolator. It also facilitates allowing the robotic arm to return the needles and tubing back into the bag for removal at the completion of the operation (e.g., a vial filling operation).

These and other provisions will become clear from the description, claims, and figures below. Various benefits, aspects, novel and inventive features of the present disclosure, as well as details of exemplary embodiments thereof, will be more fully understood from the following description and drawings. So the manner in which the features disclosed herein can be understood in detail, more particular descriptions of the embodiments of the disclosure, briefly summarized above, may be had by reference to the appended drawings. It is to be noted, however, that the appended drawings illustrate only typical embodiments of this disclosure and are therefore not to be considered limiting of its scope, for the described embodiments may admit to other equally effective fluid transfer systems for use in bags, bioreactors, and/or isolators. It is also to be understood that elements and features of one embodiment may be found in other embodiments without further recitation and that, where possible, identical reference numerals have been used to indicate comparable elements that are common to the figures. As used herein, the singular forms "a," "an," and "the" include plural referents unless the context dearly dictates otherwise. Unless defined otherwise, all technical and scientific terms used herein have the same meaning as commonly understood by one of ordinary skill in the art to which these embodiments pertain. Also, the following terms used herein are subject to the following definitions, unless the context indicates otherwise.

DETAILED DESCRIPTION OF THE DISCLOSURE

This disclosure describes a product and method that facilitates the use of a robotic arm to move flexible, difficult-to-handle devices, e.g., a liquid transfer needle set, from a bag into an isolator. It also facilitates allowing the robotic arm to return the needles and tubing back into the beta bag for removal at the completion of the operation (e.g., a vial filling operation).

Current robots are relatively dexterous and can remove apparatus, e.g., filling needles, from a bag without causing a manufacturability issue. The apparatus needs to be substantially oriented and consistently located within the bag for the robot to be capable of grasping the apparatus. However, returning the needles into the bag often presents a problem. In biological operations, needles are attached to the end of silicone tubes through which liquid is pumped. The tubes have no rigidity; they are very flexible. They may also be sticky. Once the tubes are pulled into the isolator, along with the needles, it is very difficult to push, return, or otherwise deliver them to the isolator. This operation can be described as akin to pushing a sticky piece of string. This is not a problem if the isolator has a glove port, wherein a person uses the glove to grab the tubes and place them back into the bag. However, it is much more difficult for a robot to push the tubing into the bag. And, if the tubing is not properly returned to the bag, the tubing obstructs the closing of the port door.

At least one method described herein comprises setting the needles into a rigid block at a set distance apart. The rigid block also provides an easy feature for the robot to grab and safely manipulate. A crown can be placed inside an internal diameter of the port, also known as a beta port. The crown comprises an anchoring point for a biasing element. In some embodiments, the biasing element is an extension spring. In some embodiments, the biasing element is coiled tubing. One end of the spring, or of the tubing, is releasably attached to a yoke. The yoke holds the tubes or tubing firmly. However, the yoke does not prevent the tubing from moving with the needles as the robot pulls the needles into the isolator. As the needles, tubes and yoke are pulled forward by the robot, the extension spring (or coiled tubing) extends. Because the tubing is flexible, the robot can move the needles up and down (as would be done in a filling operation) or side to side.

Following the bioprocessing operation, e.g., filling of vials with biological product, which occurs within the isolator, a robot can push the needle block back into the bag for removal. Because the extension spring, or coiled tubing, attached to the yoke is under tension, the tubes are pulled into the bag so that they cannot obstruct the closing of the port door.

Figure 1:
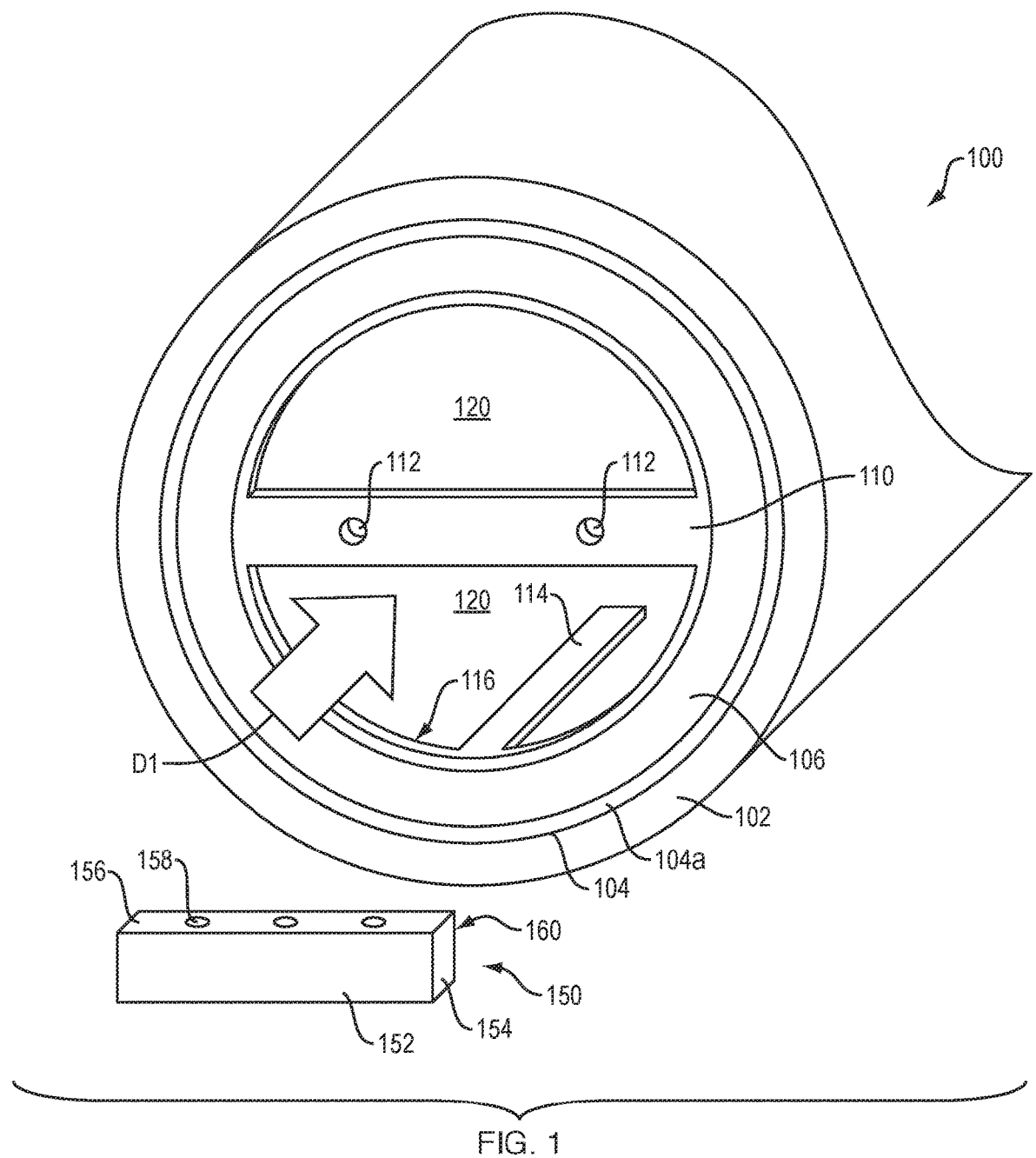
FIG. 1 depicts a front elevation view of a crown and a needle block, according to the present disclosure.

FIG. 1 depicts a front elevation view of a crown 100 and a needle block 150, according to the present disclosure. The crown 100 comprises a front surface 102. The front surface 102 locates the apparatus axially within the beta port, optionally mating with stops on the beta port (discussed further below), so that a door of the beta port cannot be pushed too far into the beta port. An optional sealing area 104, as shown with an optional gasket 104a, is recessed from the front surface 102. A middle surface 106 is recessed from the sealing area 104. A rear surface 106 is coplanar with or recessed from the middle surface 104. The rear surface 106 further comprises a middle support 110 having two or more fastener holes 112. The crown 100 optionally comprises one or more anchoring supports 114, which extend from a rear surface 116 of the crown 100. In some embodiments, the crown 100 forms two half moon shaped channels 120 (or approximating a half moon shape), which are adjacent to the middle support 110. In practice, the middle support 110 need not form channels 120 that are equivalent in size or shape.

The crown 100 may be made of metals, ceramics, or polymers or any other suitable material. Some polymers include, but are not limited to, various polyolefins such as polyethylene, e.g., low density polyethylene, linear-low density polyethylene, medium density polyethylene, high density polyethylene, ultra-high density polyethylene, and the like. The crown 100 may also be made of polyacetal, nylon 6, nylon 66, polypropylene, acrylonitrile-butadiene-styrene, or other polymers and/or blends thereof. Any of the previously mentioned polymer materials may comprise fillers and/or reinforcements, such as glass fibers, carbon fibers, nylon fibers, wood fibers, aramid fibers, and the like. In some embodiments, the crown 100 comprises a polymer or a co-polymer that is gamma stable so that the crown 100 can be sterilized with gamma radiation. The crown 100 may be sterilized in other ways, e.g., treatment with chemicals, e.g., ethylene oxides, alcohols, ozone treatments, and the like, steam treatments, and other sterilization treatments known to those in the art.

FIG. 1 also depicts the needle block 150, which comprises a front side 152 and a lateral side 154. The needle block 150 comprises one or more through holes 158 on a top surface 156. The needle block 150 also comprises a back side 160, which comprises two or more fasteners (not shown). The fasteners correspond to fastener holes 112 in the crown 100 to releasably anchor the needle block 150 to the crown 100. The needle block 150 can be releasably adhered to the crown 100 by mating the fasteners with the fastener holes 112 by forcing the needle block 150 in direction D1. The needle block 150 may comprise any of the materials, as described above, for the crown 100.

Figure 2:
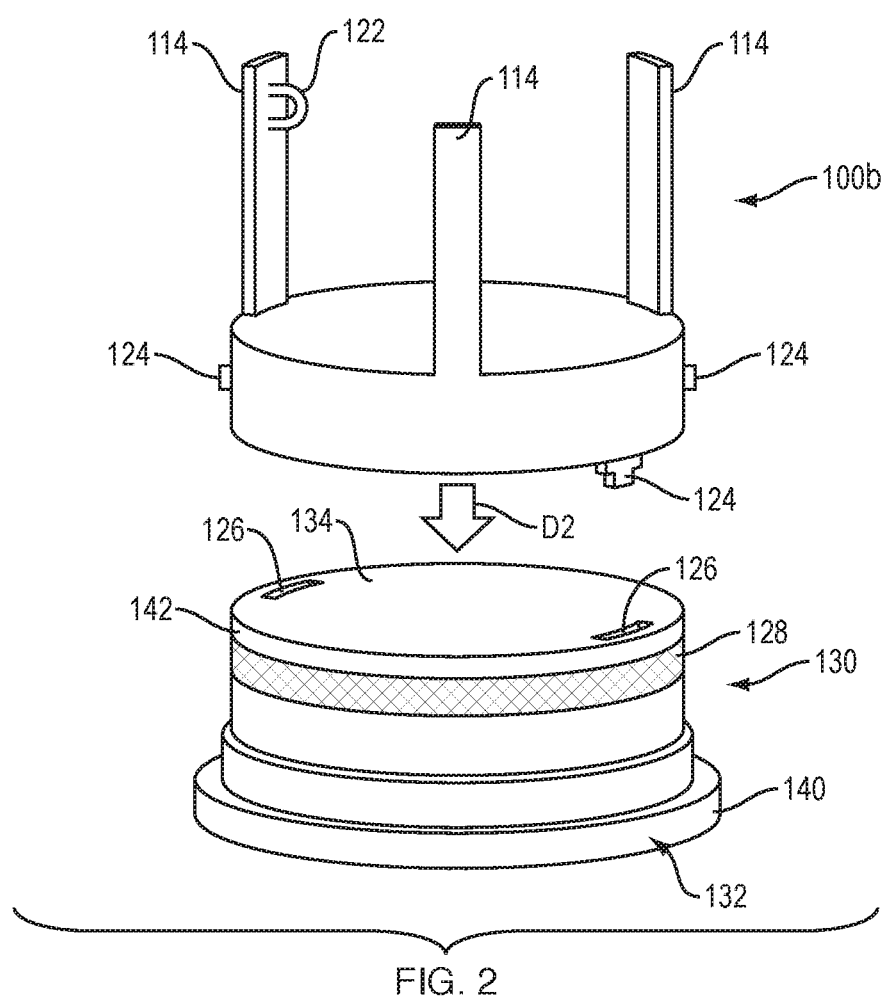
FIG. 2 depicts a side perspective view of a beta port, according to embodiments of the disclosure.

FIG. 2 depicts a side perspective view of a beta port 130, according to embodiments of the disclosure. The beta port 130 is generally cylindrical and optionally comprises flange 140 on a front side 132. The beta port 130 may be placed in an alpha port (not shown) of an isolator (not shown) as are known to those in the art. The flange 140 may also be used in conjunction with a door (not shown) of an alpha port. The beta port 130 further comprises a bag attachment area 128 on an external surface 142 of the beta port 130. The beta port 130 further comprises attachments areas 126 on inner surface 134 for releasably attaching the crown 100. The attachment areas 126 can comprise any attachment mechanism(s) known to those in the art. For example, the attachment areas 126 may be a hole for a snap fit (as described below) or a mating beam and catch on both the crown 100a, 100b and beta port 130. Some embodiments comprise bosses, tabs, spring-loaded attachments, ball plungers, such as a VLIER® plunger(s), a bayonet mount, and the like.

Figure 3:
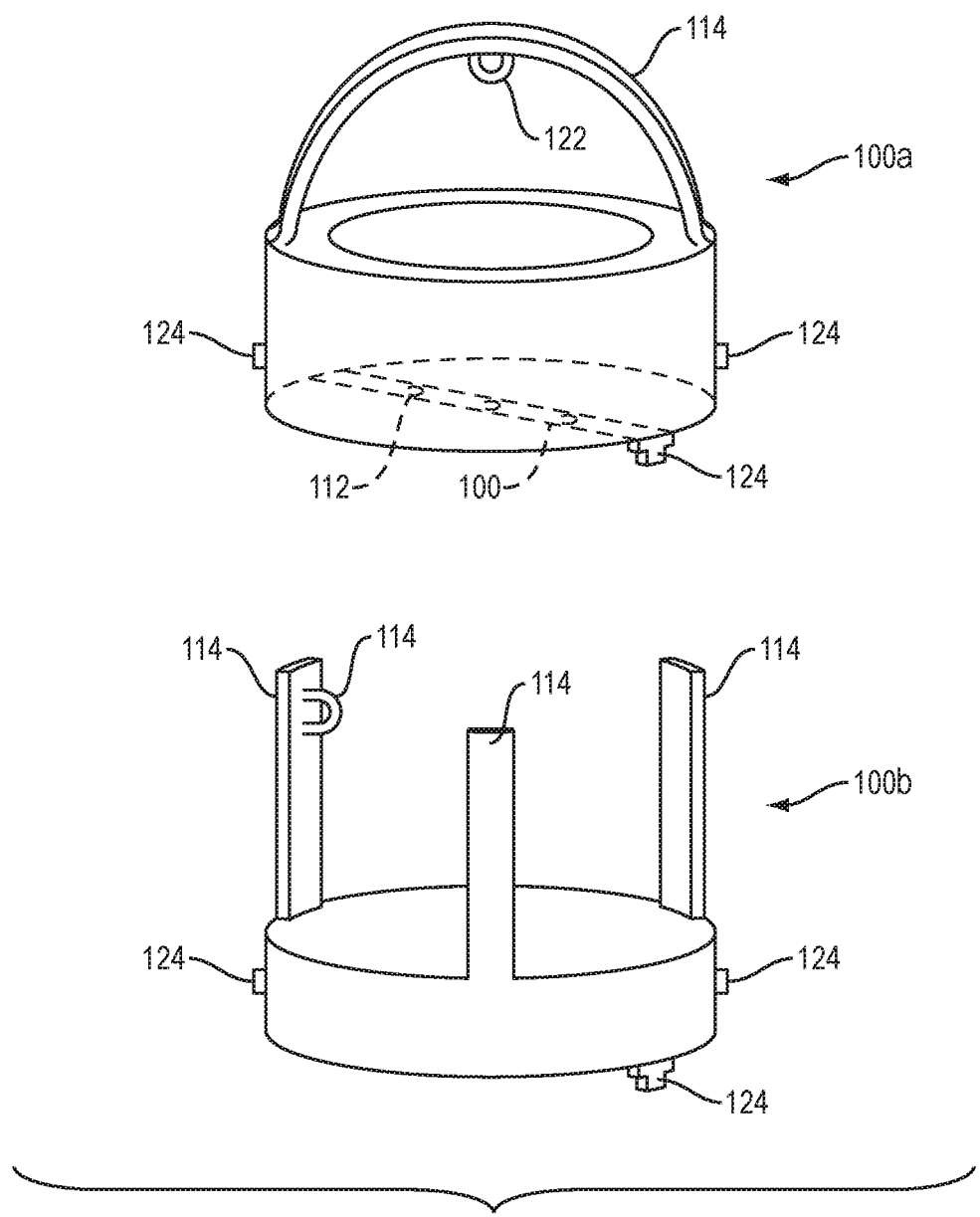
FIG. 3 depicts at least two embodiments of crowns having at least one anchoring support and a spring hook, according to embodiments of the disclosure.

FIG. 3 depicts at least two embodiments of crowns 100a, 100b having at least one anchoring support 114 and a spring hook 122, according to embodiments of the disclosure. FIG. 3 depicts a crown 100a, an anchoring support 114, and a spring hook 122. As shown, the anchoring support 114 traverses opposing sides of a surface 125. Also, as shown, the spring hook 122 is disposed near as center of the anchoring support 114, although, in practice, there is no requirement that the spring hook 122 be at or near the center of the anchoring support 114. Also shown, in hidden lines, is the middle support 110 having three fastener holes 112.

FIG. 3 further depicts a crown 100b having three anchoring supports 114. At least one of the anchoring supports 114 further comprises a spring hook 122. It is to be understood that one anchoring support 114 having one spring hook 122 is sufficient for operation. Nonetheless, more than one anchoring support 114, each having a spring hook 122 is contemplated herein. Also, as shown, the crown 100b comprises mount features 124. For example, the mount features may comprise a beam and a catch for forming a snap fit with a corresponding hole on a mating part, here, the beta port 130. As the crown 100b is mated with the beta port 130, by forcing the crown 100b and beta port 130 together in direction D2, the crown 100b travels into the beta port 130, where the bayonet mount features 124 mate with the attachment areas 126. When the crown 100a, 100b is mated with the crown 130, it is located so that axial and rotational movement is restricted.

Figure 4:
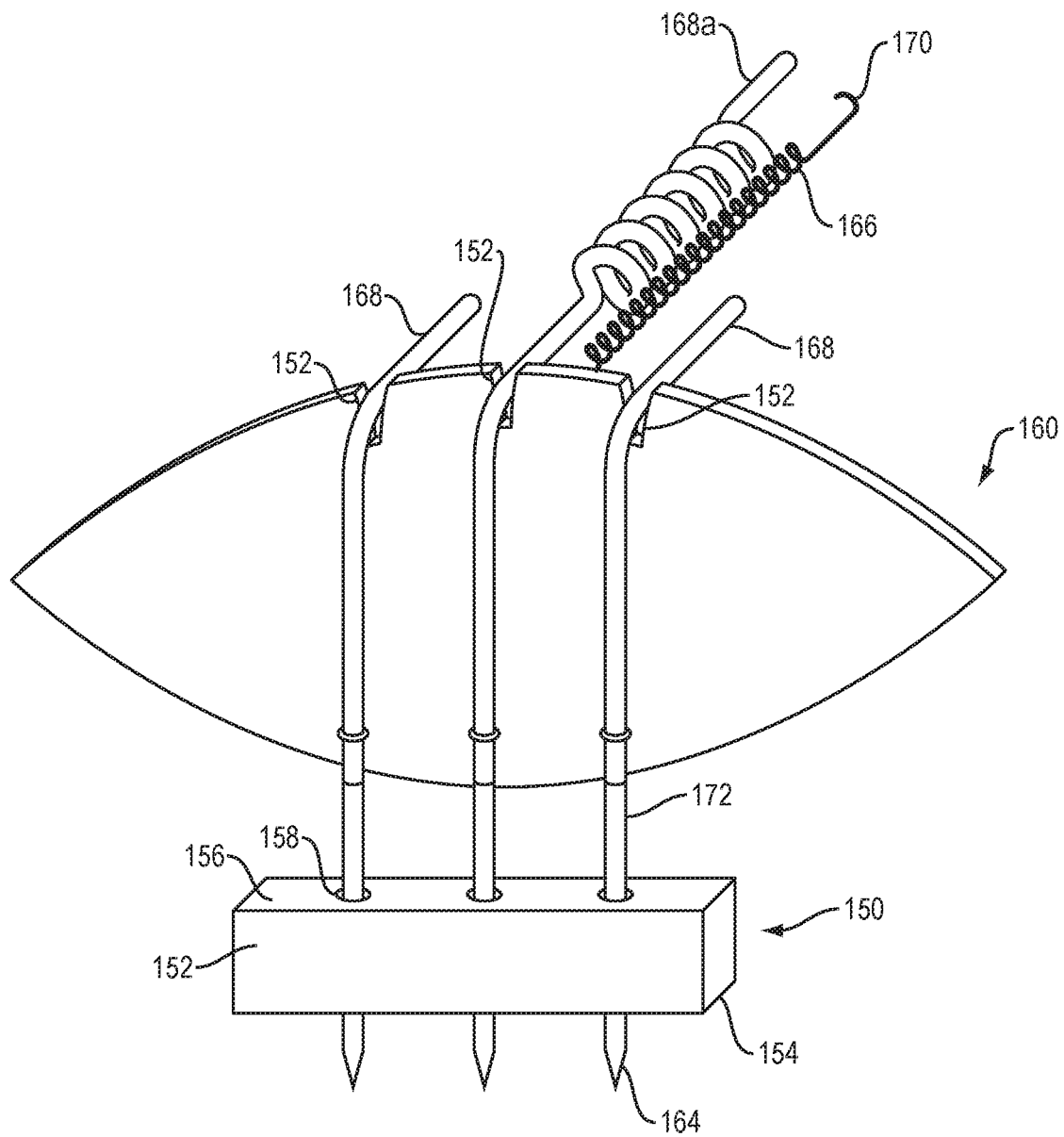
FIG. 4 depicts a yoke and a needle block, and needles and tubing, according to embodiments of the disclosure.

FIG. 4 depicts a yoke 160 and a needle block 150, and needles 164 and tubing 168, according to embodiments of the disclosure. The yoke 160 comprises slots 152. Three slots 152 are depicted though any amount from one to as many as may be commercially needed for any particular operation can be incorporated into the yoke 160. The slots 152 may optionally comprise draft angles to provide interference fits or to accommodate tubing 168 of varying thickness.

As shown, the tubing 168 is inserted into the slots 152. The tubing 168 may be uncoiled or coiled as in tubing 168a. The coiled tubing 168a may provide a tensioning or biasing when the yoke 160 is operating in a fill and finish operation, as is known to those of skill in the art. The tubing 168 may be any suitable tubing for bioprocessing, such as a silicon tubing, vinyl tubing, fluoropolymers, polyamides, polyurethanes, polyolefins, such as polyethylene and polypropylene, and the like. It is to be understood that the coiled tubing may act as its own spring and may be used in conjunction with springs or instead of the springs. Furthermore, if the tubing is coiled, the yoke 160 may be omitted from the apparatus.

At a distal end 172 of the tubing 168 is a needle 164. The needle(s) 164 may be placed in a needle block 150 at through holes 158 on the top surface 156. As will be described more completely below, the needle block 150 can be manipulated by a robot to perform fill and finish operations within an isolator, e.g., filing vials or other containers with biological fluids for handling and storage. The yoke 160 has a biasing element associated therewith. The biasing element is a tensioner. In other words, the tensioner can be put under a tensile force so that the yoke retracts to a different position when not under tension. For example, at least one biasing element is a spring 166, having a hook 170 at one end, for connecting with the spring hook element 122, described above, while a second end of the spring 166 is connected with the yoke 160. A second biasing element comprises a tubing 168a, which itself, being coiled, is a biasing element. Other biasing elements may be used. For example, an elastic band, a retractable string within a housing, or other compliant member that retracts when a tensile force is removed. Any one or a plurality of biasing elements may be used with a yoke 160. In some embodiments, a coiled tubing 168a and a spring 166 are used simultaneously.

Figure 5:
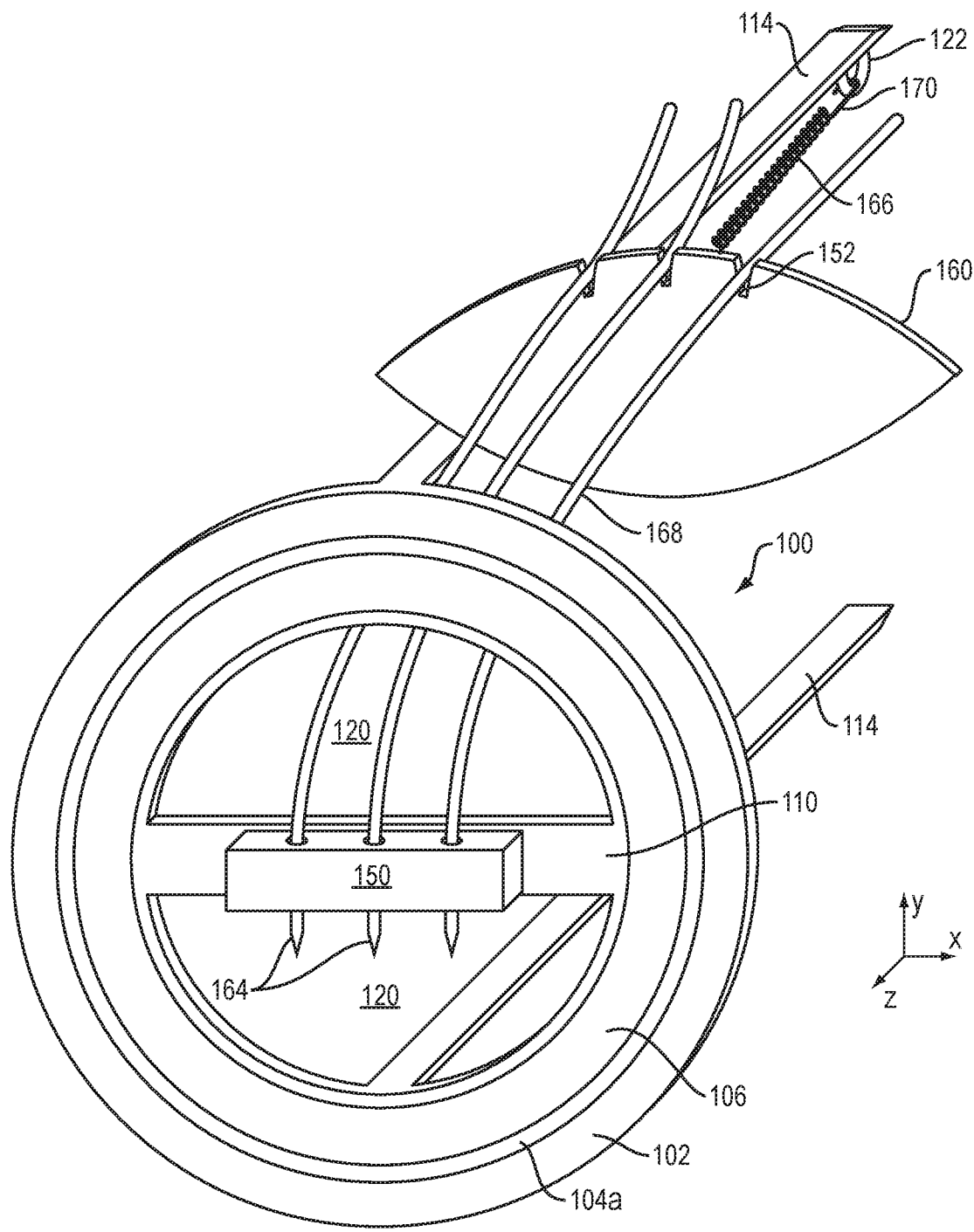
FIG. 5 depicts the needle block having needles attached to tubing and joined to the crown, according to embodiments of the disclosure.

FIG. 5 depicts the needle block 150 having needles 164 attached to tubing 168 and joined to the crown 100. As shown, the yoke 160, with the tubing 168 positioned within the slots 152, is in a retracted position, i.e., the spring 166 is attached to the spring hook element 122 in a little to tensile force-free status. Although not shown, a robot is capable of grabbing the needle block 150 and delivering the needle block 150 and needles 164 to a fill and finish station and pulling the needle block 150 in a +z direction. In this state, the yoke 160 is also pulled through either of the channels 120 so that the yoke 160 is forward of the front surface 102 of the crown 100. Pulling the needle block 150 in the +z direction places the biasing element, the spring 166 as shown in FIG. 5, under a tensile force. When the fill and finish operation is complete, the robot can return the needle block 150 to re-join with the crown 100. Because the yoke 160 houses the tubing 168, the tubing 168 is automatically retracted to a position behind the crown 100. It is to be understood that an extending tube, not shown, may be releasably joined between the beta port 130 and the crown 100.

Figure 6:
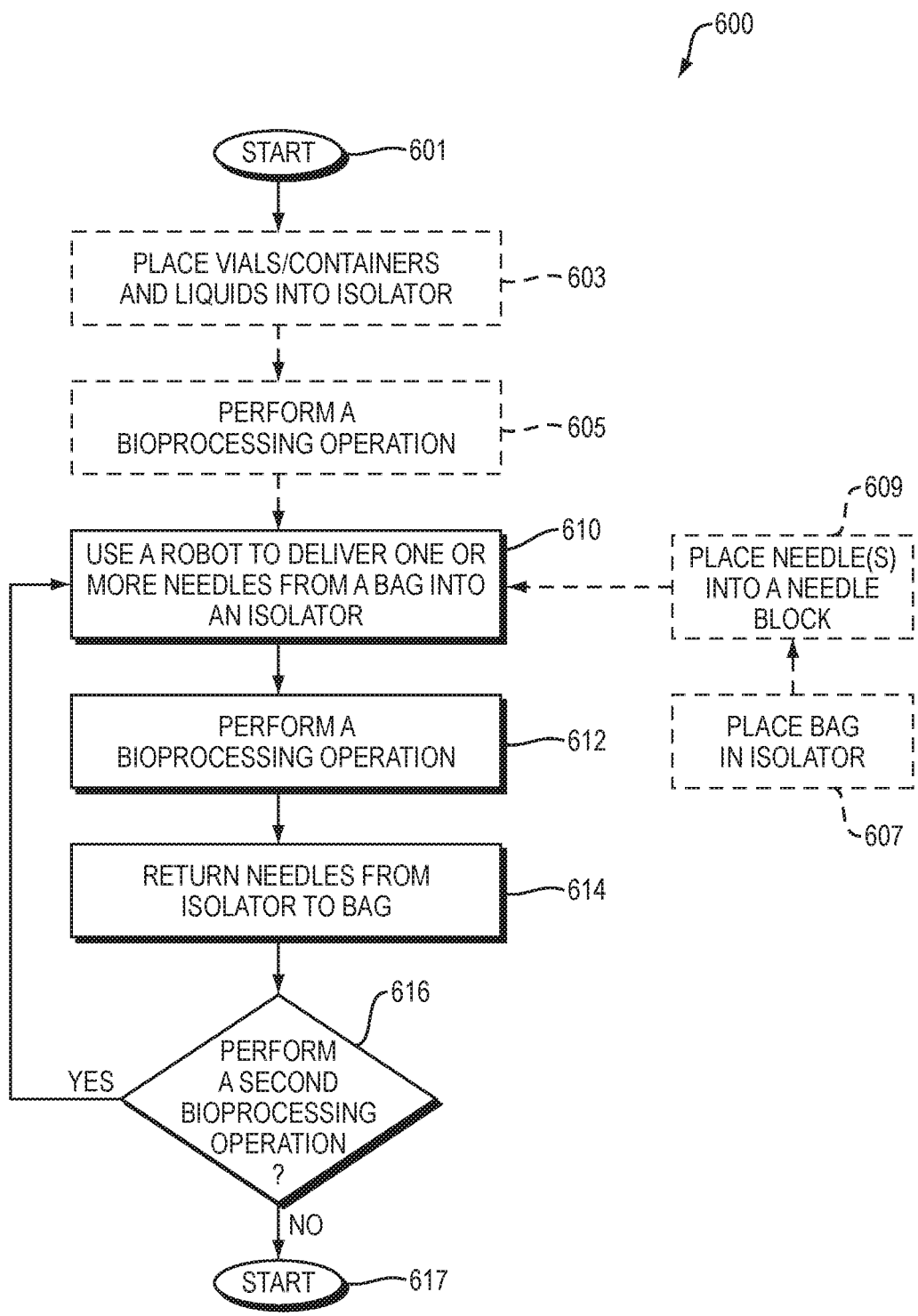
FIG. 6 depicts an aseptic method for transferring a flow path to and/or from an isolator, according to embodiments of the disclosure.

FIG. 6 depicts an aseptic method 600 for transferring a flow path to and/or from an isolator, according to embodiments of the disclosure. In some embodiments, the flow path may be a single use flow path. In some embodiments, the isolator does not comprise glove ports. In some embodiments, the isolator comprises a robot for performing operations. The aseptic method 600 begins at step 601. At step 603, optionally, vials and/or containers and/or liquids are placed into an isolator. For example, the isolator, such as a glove port-less isolator described above. Also, optionally, a bioprocessing operation is performed at step 603. For example, a culturing step, a purification step, a cell harvesting step, a polishing step, an ultrafiltration step and other bioprocessing operations known to those in the art.

At step 607 and step 609, optionally, a bag, such as a beta bag, which optionally has needles and tubing therein, is placed into the isolator. In some embodiments, the needles are positioned within a needle block, as described above. Also, in some embodiments, the tubing is positioned within a yoke, as described above. At step 610, a robot grips a needle block having needle(s) positioned therein and delivers the needle block into the isolator for a bioprocessing operation, wherein the needle block is joined to a crown, as described above, and wherein the yoke, having tubing joined therewith, is connected to a support on the crown via a biasing element, as described above. The biasing element ay be, for example, a spring, coiled tubing, a retractable string mechanism, and the like.

At step 612, the bioprocessing operation is conducted. For example, the bioprocessing operation may be a fill and finish operation, wherein a fluid flows through the tubing, out a needle(s), and into container(s) or vial(s). When the bioprocessing operation is completed, the needle block, needle(s), and tubing(s) are returned to the bag. It is contemplated that the robot pushes the needle block, needle(s), and tubing(s) into the bag. At step 616, optionally, an inquiry is whether to perform a second bioprocessing operation. If the answer is yes, the method 600 returns to step 610. If the answer is no, the method 600 stops at step 617.

Figure 7:
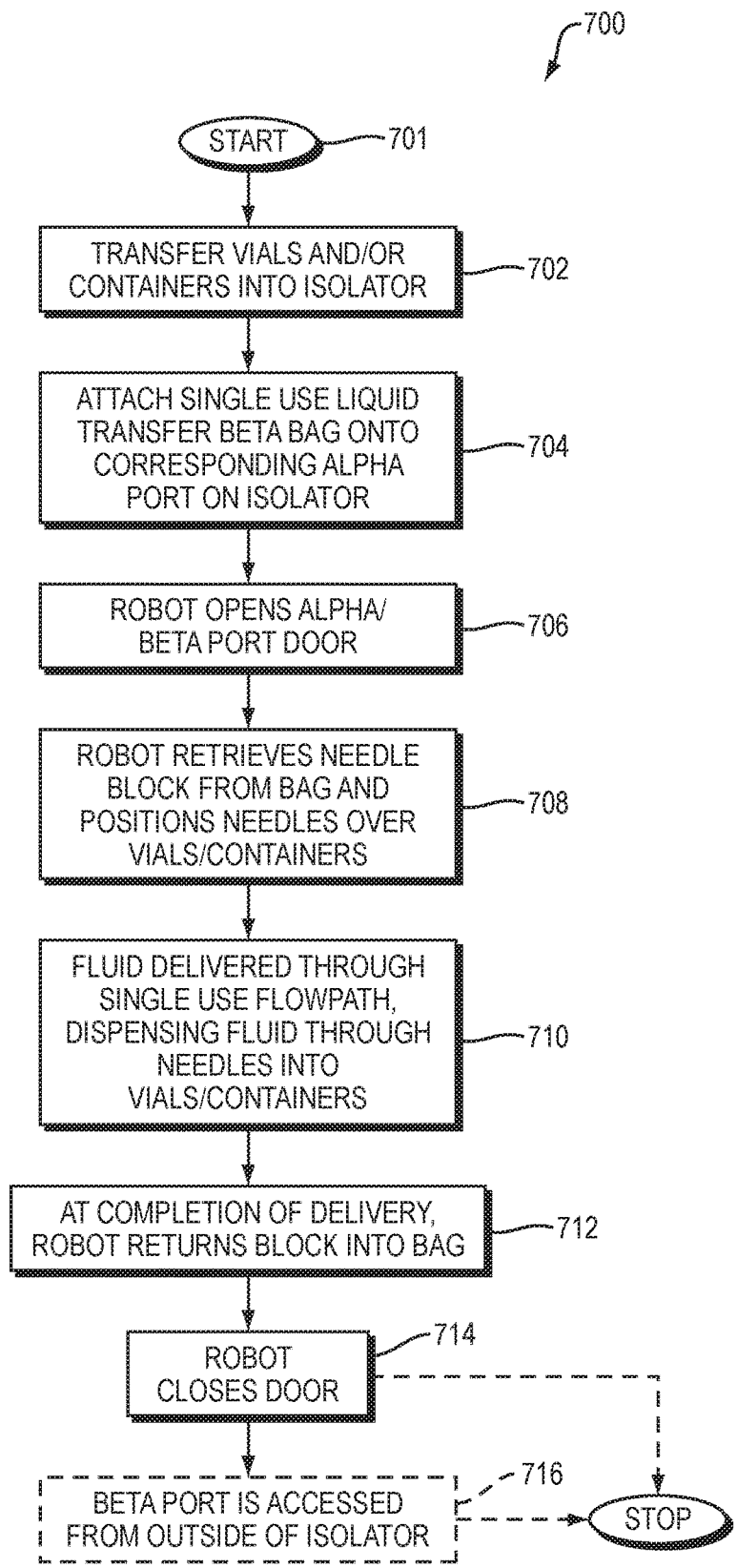
FIG. 7 depicts a second aseptic method for transferring a flow path to and/or from an isolator, according to embodiments of the disclosure.

FIG. 7 depicts a second aseptic method 700 for transferring a flow path to and/or from an isolator, according to embodiments of the disclosure. In some embodiments, the flow path may be a single use flow path. In some embodiments, the isolator does not comprise glove ports. In some embodiments, the isolator comprises a robot for performing operations. The method 700 begins at step 701. At step 702, vials and/or containers are transferred into an isolator. The method 700 then proceeds to step 704, where a beta bag, such as a single use liquid transfer beta bag, is attached to an alpha port, as described herein, of the isolator. At step 706, a robot opens the alpha/beta door of the isolator. At step 708, the robot then grasps and retrieves the needle block, which has needles placed therein, and positions the needle block so that the needles are capable of filling the vials/containers. At step 710, fluid, such as a biological fluid, is delivered through a flow path, e.g., a single use flowpath, e.g., needles/tubing, dispensing the fluid into the vials/containers. In some embodiments, the fluid is pumped through the flowpath. In some embodiments, the pump is a peristaltic pump.

When the fluid delivery is complete for any given operation, the robot returns the needle block to the bag at step 712. In some embodiments, the needle block is re-located onto a crown, as described above. Also, because the needles/tubing are under tension, as described above, the needles/tubing are automatically pulled or otherwise returned into the bag. At step 714, the robot closes the door. At step 716, optionally, the beta poor is accessed from outside the isolator. The method 700 then stops.

All ranges recited herein include ranges therebetween and can be inclusive or exclusive of the endpoints. Optional included ranges are from integer values therebetween (or inclusive of one original endpoint), at the order of magnitude recited or the next smaller order of magnitude. For example, if the lower range value is 0.2, optional included endpoints can be 0.3, 0.4, . . . 1.1, 1.2, and the like, as well as 1, 2, 3 and the like; if the higher range is 8, optional included endpoints can be 7, 6, and the like, as well as 7.9, 7.8, and the like. One-sided boundaries, such as 3 or more, similarly include consistent boundaries (or ranges) starting at integer values at the recited order of magnitude or one lower. For example, 3 or more includes 4, or 3.1 or more.

Reference throughout this specification to "certain embodiments," "one or more embodiments," "some embodiments," or "an embodiment" indicates that a feature, structure, material, or characteristic described in connection with the embodiment is included in at least one embodiment of the disclosure. Therefore, the appearances of the phrases such as "in one or more embodiments," "in certain embodiments," "some embodiments," or "in an embodiment" throughout this specification are not necessarily referring to the same embodiment.

Publications of patents and applications cited in this specification are incorporated by reference in their entirety as if each individual citation or portion thereof were specifically and individually incorporated by reference herein as being fully set forth. Any patent application to which this application claims priority is also incorporated by reference in entirety.

What is claimed is:

1. An apparatus for use with an isolator, comprising:
   a crown for releasably joining with a beta port of the isolator, wherein the crown includes at least one anchoring support;
   a spring hook on the at least one anchoring support;
   a needle block including at least one through hole for having at least one needle positioned therein, wherein the at least one needle is joined with tubing;
   a yoke; and
   a biasing element releasably joined with the yoke and the at least one anchoring support;
   wherein the needle block is releasably joined to the crown.

2. The apparatus of claim 1, wherein the crown comprises three anchoring supports.

3. The apparatus of claim 1, wherein the yoke comprises slots for having tubing positioned therein.

4. The apparatus of claim 1, wherein the biasing element comprises a spring.

5. An aseptic method for transferring a flow path to or from an isolator, comprising:
   placing a bag on a beta port of an isolator;
   placing a needle connected with tubing in a needle block comprising at least one through hole;
   releasably attaching the needle block to a crown;
   attaching the crown with the beta port;
   attaching a yoke to the crown via a biasing element, wherein the tubing is releasably joined with the yoke;
   gripping the needle block with a robot, wherein the robot pulls the needle block out of the bag, putting the biasing element under a tensile force;
   performing a bioprocessing operation; and
   returning the needle block and tubing to the bag, wherein the robot uses a pushing force to deliver the needle block and tubing to the bag.

6. The aseptic method of claim 5, wherein the yoke comprises slots.

7. The aseptic method of claim 5, wherein the crown is joined to an internal surface of the beta port.

8. The aseptic method of claim 5, wherein the biasing element is a spring.

9. The aseptic method of claim 5, wherein the biasing element is a coiled tubing.

10. The aseptic method of claim 5, wherein the needle block comprises a plurality of through holes.

11. The aseptic method of claim 5, wherein the needle block comprises posts for releasably connecting with holes on the crown.

12. The aseptic method of claim 5, wherein the bioprocessing operation is a fill and finish operation.

13. An aseptic method for transferring a flowpath to or from an isolator using a robot, comprising:
   transferring containers to an isolator;
   attaching a beta bag to the isolator;
   opening a door of the isolator using the robot;
   grasping a needle block with the robot, which has needles and tubing placed into the needle block and is connected with a biasing element, forming the flowpath;
   positioning the needle block so that the needles are capable of filling the containers;
   dispensing a fluid through the flowpath into the the needle block containers;
   grasping the needle block with the robot and returning to the beta bag, wherein the biasing element ensures return of the needles and the tubing into the beta bag; and
   closing the door with the robot.

14. The aseptic method of claim 13, wherein the beta bag is a single use liquid transfer beta bag.

15. The aseptic method of claim 13, wherein the fluid is a biological fluid.

16. The aseptic method of claim 13, wherein the needle block is re-located onto a crown.

17. The aseptic method of claim 13, wherein the biasing element creates a tensioning force during the step of positioning the needles.

18. The aseptic method of claim 13, wherein the door is accessed from outside the isolator following the step of closing the door.

19. The aseptic method of claim 13, wherein an apparatus is used, comprising: a crown for releasably joining with a beta port of the isolator, wherein the crown includes at least one anchoring support; a spring hook on the at least one anchoring support; the needle block including at least one through hole for having at least one needle positioned therein, wherein the at least one needle is joined with the tubing; a yoke; and the biasing element releasably joined with the yoke and the at least one anchoring support; wherein the needle block is releasably joined to the crown.

* * * * *